(12) United States Patent
Meagher et al.

(10) Patent No.: US 9,182,754 B2
(45) Date of Patent: Nov. 10, 2015

(54) METHOD AND APPARATUS FOR ANALOGUE OUTPUT CURRENT CONTROL

(71) Applicants: Rockwell Automation Limited, Maldon (GB); Gwendolyn Meagher, Sugarland, TX (US)

(72) Inventors: Thomas B. Meagher, Sugarland, TX (US); Gerald R. Creech, Danbury (GB); Philip J. Agar, Danbury (GB); Shelby A. Murrell, Dripping Springs, TX (US); Ian D. W. Jones, West Mersea (GB)

(73) Assignee: Rockwell Automation Limited (GB)

( * ) Notice: Subject to any disclaimer, the term of this patent is extended or adjusted under 35 U.S.C. 154(b) by 449 days.

(21) Appl. No.: 13/678,775

(22) Filed: Nov. 16, 2012

(65) Prior Publication Data

US 2013/0131834 A1  May 23, 2013

Related U.S. Application Data

(60) Provisional application No. 61/561,089, filed on Nov. 17, 2011.

(30) Foreign Application Priority Data

Jan. 31, 2012  (EP) ..................................... 12153386

(51) Int. Cl.
*G05B 15/02* (2006.01)
*G06F 7/02* (2006.01)
(Continued)

(52) U.S. Cl.
CPC *G05B 19/02* (2013.01); *G05B 9/03* (2013.01); *G05B 19/0425* (2013.01);
(Continued)

(58) Field of Classification Search
CPC ...... G05B 19/02; G05B 9/03; G05B 19/0425; G05B 2219/24182; G05B 2219/24163; G05B 2219/24187; G05B 2219/2489; B21B 37/74
USPC ..................................... 700/10; 714/819, 820
See application file for complete search history.

(56) References Cited

U.S. PATENT DOCUMENTS 4,024,371 A * 5/1977 Drake ........................... 219/110
4,527,247 A * 7/1985 Kaiser et al. .................. 700/278

(Continued)

FOREIGN PATENT DOCUMENTS

WO  2009155993 A1  12/2009

OTHER PUBLICATIONS

Barry W. Johnson, An Introduction to the Design and Analysis of Fault-Tolerant Systems; Book; 1996; pp. 1-54, Prentice-Hall, Inc. Upper Saddle River, NJ, USA.

(Continued)

*Primary Examiner* — Robert Fennema
*Assistant Examiner* — Thomas Stevens
(74) *Attorney, Agent, or Firm* — Boyle Fredrickson, S.C.

(57) ABSTRACT

This invention relates to an apparatus and method for output current control in an Industrial Process Control System, The output module comprises two management units each of which calculates the current demand for the module independently from one another. One management unit controls an output current controller whilst the other unit monitors the current produced by the output current controller against an independently calculated demand. The output module has multiple output modules. However rather than one module providing a backup for the other modules, or alternating between use of each module, in normal operation, each module provides a portion of the required output current, the total output current being equal to the sum of the currents output by each module. In the event of failure on one of the modules, the other module or modules switch to providing the total current required.

14 Claims, 8 Drawing Sheets

(51) Int. Cl.
*G05B 19/02* (2006.01)
*G05B 19/042* (2006.01)
*G05B 9/03* (2006.01)

(52) U.S. Cl.
CPC .............. *G05B 2219/24163* (2013.01); *G05B 2219/24182* (2013.01); *G05B 2219/24187* (2013.01); *G05B 2219/24189* (2013.01)

(56) References Cited

U.S. PATENT DOCUMENTS

| | | | |
|---|---|---|---|
| 4,868,826 A | | 9/1989 | Smith et al. |
| 4,926,281 A | | 5/1990 | Murphy |
| 5,233,231 A | * | 8/1993 | Wieth et al. ................... 307/116 |
| 5,986,480 A | * | 11/1999 | Sharpe-Geisler ............. 326/119 |
| 6,459,173 B1 | * | 10/2002 | Gunsaulus et al. ............. 307/66 |
| 6,503,649 B1 | | 1/2003 | Czajkowski et al. |
| 6,550,018 B1 | | 4/2003 | Abonamah et al. |
| 6,618,628 B1 | | 9/2003 | Davlin et al. |
| 2003/0012068 A1 | * | 1/2003 | Satani et al. .................. 365/201 |
| 2004/0165404 A1 | | 8/2004 | Eckardt et al. |
| 2005/0273207 A1 | | 12/2005 | Dougherty |
| 2008/0097629 A1 | * | 4/2008 | Weatherhead et al. ......... 700/67 |
| 2010/0278537 A1 | * | 11/2010 | Elberbaum .................... 398/112 |
| 2010/0295845 A1 | * | 11/2010 | Somerville et al. ........... 345/215 |
| 2010/0295861 A1 | * | 11/2010 | Somerville et al. ........... 345/545 |

OTHER PUBLICATIONS

PM333101EP European Search Report and Opinion of Application No. 12153386.3, 10 pages.

Mar. 26, 2015 Non-Final Office Action for U.S. Appl. No. 13/678,704, titled "Method and Apparatus for Analogue Output Current Control", 38 pages.

* cited by examiner

METHOD AND APPARATUS FOR ANALOGUE OUTPUT CURRENT CONTROL

CROSS-REFERENCE TO RELATED APPLICATIONS

This application claims priority to U.S. Provisional Application No. 61/561,089, filed on Nov. 17, 2011, and to European Patent Application No. EP12153386.3, filed on Jan. 31, 2012, the contents of each of which are hereby incorporated by reference.

BACKGROUND a. Field of the Invention

This invention relates to an apparatus and method for output current control in an Industrial Process Control System, in particular for an Industrial Process Control System suitable for:

Emergency Shutdown systems
Critical process control systems
Fire and Gas detection and protection systems
Rotating machinery control systems
Burner management systems
Boiler and furnace control systems
Distributed monitoring and control systems Such control systems are applicable to many industries including oil and gas production and refining, chemical production and processing, power generation, paper and textile mills and sewage treatment plants.

In industrial process control systems, fault tolerance is of utmost importance. Fault tolerance is the ability to continue functioning safely in the event of one or more failures within the system.

Industrial process control systems are usually specified to have a particular Safety Integrity Level. Safety Integrity Level (SIL) is defined as a relative level of risk reduction provided by a safety function, or to specify a target level of risk reduction. In simple terms, SIL is a measurement of performance required for a Safety Instrumented Function.

Within European Functional Safety standards four SILs are defined, with SIL 4 being the most dependable and SIL 1 being the least. A SIL is determined based on a number of quantitative factors in combination with qualitative factors such as development process and safety life cycle management.

b. Related Art

Fault tolerant systems are expensive to implement, and it is desirable to utilize an architecture which provides flexibility so that differing levels of fault tolerance can be provided depending upon the specified SIL.

Fault tolerance may be achieved by a number of different techniques, each with specific advantages and disadvantages.

One way in which fault tolerance may be achieved is by providing "redundancy." Critical circuits are replicated and perform identical functions simultaneously and independently. The data outputs from replicated circuits are compared, and action taken depending upon the results. For example in a triplicated system a two out of three voting system may be implemented where if any two of the outputs agree then those values are assumed to be correct. Such solutions, whilst effective, are complex and costly to implement.

Another approach to fault tolerance is the use of hot-standby modules. This approach provides a level of fault tolerance whereby a standby module maintains system operation in the event of module failure. With this approach there may be some disruption to system operation during the changeover period.

Fault tolerant systems ideally create a Fault Containment Region (FCR) to ensure that a fault within the FCR boundary does not propagate to the remainder of the system. This enables multiple faults to co-exist on different parts of a system without affecting operation.

Fault tolerant systems may also employ dedicated hardware and software test and diagnostic regimes that provide very fast fault recognition and response times to provide a safer system.

Safety control systems are generally designed to be "fail-operational/fail-safe." Fail operational means that when a failure occurs, the system continues to operate: it is in a fail-operational state. The system will continue to operate in this state until the failed module is replaced and the system is returned to a fully operational state.

There are several problems associated with the use of hot standby modules. A fault must be accurately detected, the faulty module needs to be isolated quickly, and the standby module needs o be deployed quickly. Furthermore, it is necessary to have a system which ensures that the standby module is in working correctly itself order to take control.

It is difficult to achieve fault tolerant output modules for a current source due to the need for coordinating the sharing of current between replicated elements of a fault tolerant design to maintain the correct demanded current in the event of a failure. This invention provides an improved output module providing a current source, for use in fault tolerant industrial process control systems which overcomes some of the problems associated with the use of hot standby modules.

SUMMARY OF THE INVENTION

The output module comprises two management units each of which calculates the current demand for the module independently from one another. One management unit controls an output current controller whilst the other unit monitors the current produced by the output current controller against an independently calculated demand.

In one embodiment of the invention the output module has multiple output modules. However rather than one module providing a backup for the other modules, or alternating between use of each module, in normal operation, each module provides a portion of the required output current, the total output current being equal to the sum of the currents output by each module. In the event of failure on one of the modules, the other module or modules switches to providing the total current required and the failed module is switched to a fail safe mode by using an isolation circuit to switch off the output current from that module.

The output module also provides improved fail safe protection by providing an improved isolation circuit and an improved method of continually testing that the isolation circuit will operate correctly in the event that it is required to switch a module to a fail safe mode Having multiple modules providing a proportion of the commanded current and having the current provided by each module monitored by an independent unit, means that each module is constantly checked and a failure in either module is detected very quickly.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Embodiments of the invention will now be described, by way of example only, with reference to the accompanying drawings, in which.

DETAILED DESCRIPTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
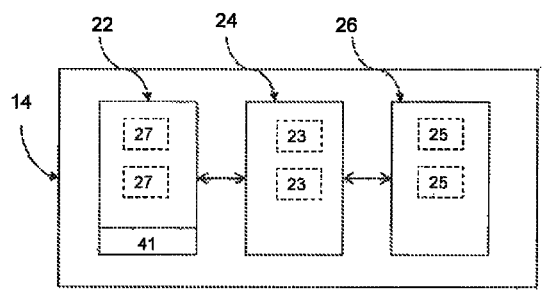
FIG. 1 illustrates schematically a controller for an industrial process control system.

An example industrial process controller 14 which may use an output module according to the present invention will now be described with reference to FIG. 1.

A controller 14 for monitoring and controlling industrial process control equipment generally comprises an input assembly 22 comprising one or more input modules 27, a processor assembly 24 comprising one or more processing modules 23 and an output assembly 26 comprising one or more output modules 25.

It will be appreciated that various different configurations using different numbers of modules will provide different SILs.

Where an assembly provides more than one module for redundancy purposes it may be possible to replace a failed module with a replacement module whilst the industrial process control system is operational (i.e. online replacement is possible without having to perform a system shutdown). Online replacement is not possible for a simplex assembly without interruption to the process.

Input assembly 22 receives signals from sensors monitoring industrial process control equipment via a field conditioning circuit 41 which transforms the signal to a desired voltage range and distributes the signal to the input module(s) as required.

The input module reads the signal and then passes resulting data to the processor assembly 24 for analysis. After analysing the received input data the processor assembly sends command data to the output assembly 26 which generates drive signals to control the industrial process control equipment.

The input sensor signals and output drive signals are sent over separate analogue current loops.

Analogue current loops are used where a field device is to be monitored or controlled remotely over a pair of conductors. Only one current level can be present at any one time. The output module of the present invention uses a 4-20 mA (four to twenty milliamp current loop) which is an analogue electrical transmission standard for industrial instrumentation and communication. The signal is provided via a current loop where 4 mA represents zero percent signal and 20 mA represents the one hundred percent signal. Use of a 4 mA signal to represent zero allows an open circuit condition to be detected.

The output module of the present invention also uses the Highway Addressable Remote Transducer (HART) Communications Protocol which is a digital industrial automation protocol which can communicate over legacy 4-20 mA analogue instrumentation wiring, sharing the pair of wires used by the older system.

The HART protocol makes use of the Bell 202 compatible Frequency Shift Keying (FSK) to superimpose digital communication signals at a low level on top of the 4-20 mA. Bell 202 compatible systems use 1,200 Hz for the mark tone (a "1") and 2,200 Hz for the space tone (a "0").

This enables two-way field communication to take place and makes it possible for additional information beyond just the normal process variable to be communicated to/from a smart field instrument. The HART protocol communicates at 1200 bps without interrupting the 4-20 mA signal and allows a host application to obtain two or more digital updates per second from a field device. As the digital FSK signal is phase continuous, there is no interference with the 4-20 mA signal.

Figure 2:
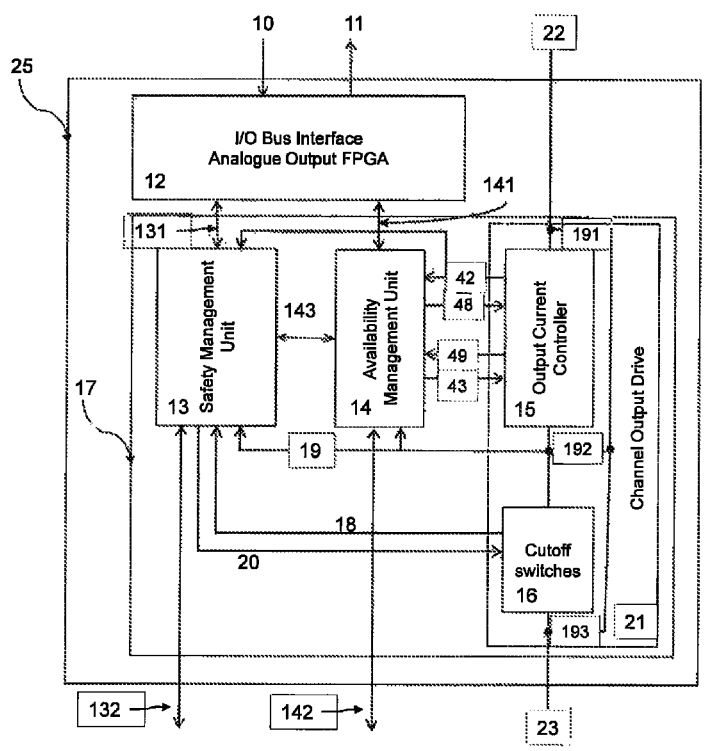
FIG. 2 is a block diagram illustrating an analogue output module.

An embodiment of an analogue output module 25 will now be described with reference to FIG. 2.

The analogue output module 25 comprises an I/O bus interface in the form of a field programmable gate array (FPGA) 12 which receives a command signal 10 from a processing module 23 and send a response signals 11 to a processing module 23. The FPGA 12 communicates with an availability management unit 14 and a safety management unit 13 in an output channel 17. The output channel 17 further comprises a channel output drive 21, to drive the 4-20 mA loop signal 22, 23, the channel output drive 21 comprising an output current controller 15 and cutoff switches 16.

The availability management unit 14 and the safety management unit 13 residing on an output module 25 communicate with corresponding units of a partner analogue output channel 17' residing on a partner output module 25' via signal buses 132 and 142.

Figure 3:
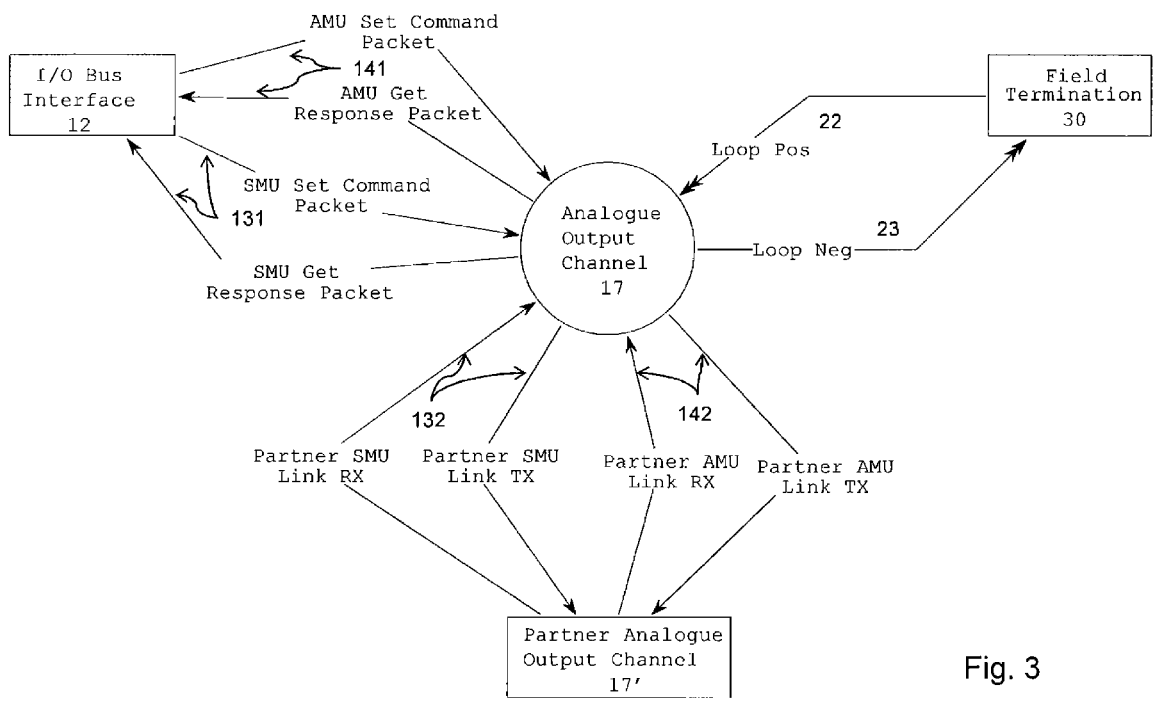
FIG. 3 is a diagram illustrating schematically connections between an analogue output channel driving a field termination assembly and a partner analogue output channel.

FIG. 3 is a diagram illustrating schematically connections between an analogue output channel 17 driving a field termination assembly 30 and a partner analogue output channel 17'. Communication messages between the analogue output channel 17 and the partner analogue output channel 17' will be described in more detail later.

Figure 4:
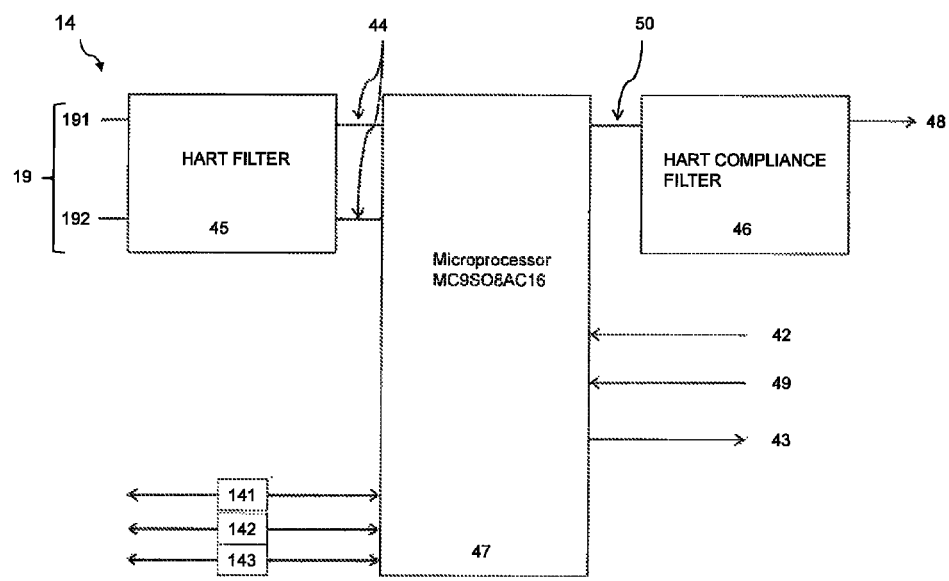
FIG. 4 is a block diagram illustrating an availability management unit.

FIG. 4 is a diagram illustrating the availability management unit (AMU) 14 in more detail. The availability management unit receives loop voltage input signal(s) 19 comprising a first positive voltage monitor signal 191 and a second negative voltage monitor signal 192. The AMU receives a voltage reference signal 42 and a AOUT drive signal 49 from the current output controller 15 and generates a current control drive signal 43 in dependence on the input signals to drive the output current controller 15. The AMU 14 comprises a microcomputer 47, a HART filter 45 to filter the HART element of the input voltage signal(s) 19 and generate HART filtered signal(s) 44. The microcomputer 47 generates a square wave signal 50 to drive a HART Compliance Filter 46 to create a HART compliant signal 48 to be superimposed on the 4-20 mA loop output signal. The availability management unit communicates with a partner AMU within the partner analogue output channel 17' via signal bus 142, with I/O bus interface 12 via signal bus 141 and with the safety management unit (SMU) 13 via signal bus 143.

Figure 5:
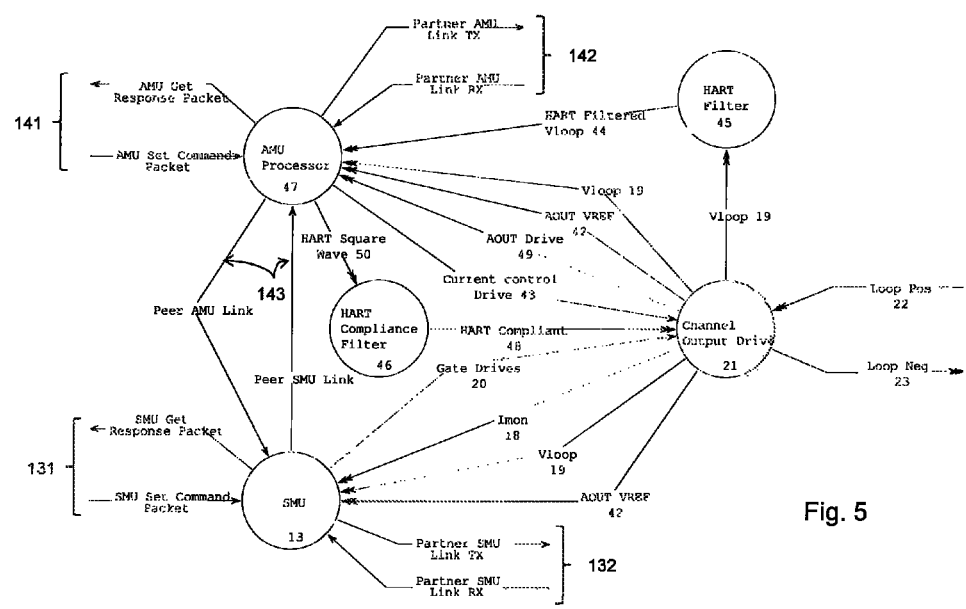
FIG. 5 is a diagram illustrating schematically the signals that pass between the various modules of the analogue output channel.

FIG. 5 is a diagram illustrating schematically the signals that pass between the various modules of the analogue output channel 17.

The safety management unit 13 receives and validates safety commands via a communications bus 131 from the FPGA 12 and monitors the output current via a pair of current monitor signals 18 received from the channel output drive 21. The safety management unit also receives the following voltage signals from the channel output drive 21: voltage monitor signals 19 comprising the first voltage monitor signal 191, the second voltage monitor signal 192 and a third voltage monitor signal 193, and the output reference voltage 42.

The safety management unit comprises a microprocessor which controls cutoff switches 16 in the channel output drive by means of a pair of gate drive signals 20.

In the event that the monitored current deviates from an expected value, i.e., the value that has been commanded by the I/O bus interface 12, the safety management unit 13 will cause the output channel 17 to enter a failsafe mode by causing the gate drive signals 20 to disable the current output using the cutoff switches 16.

The safety management unit 13 periodically tests parallel shutdown paths within the cutoff switches 16. The safety management unit 13 also provides detection and recovery for open circuit conditions in the output channel 17.

Figure 6:
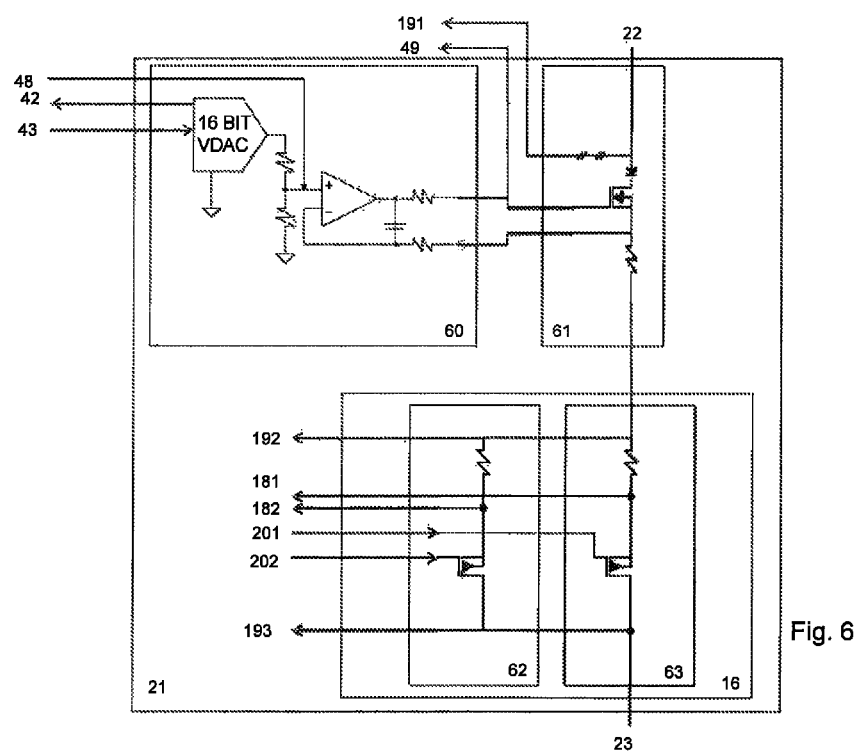
FIG. 6 is a block diagram showing the channel output drive.
Figure 7:
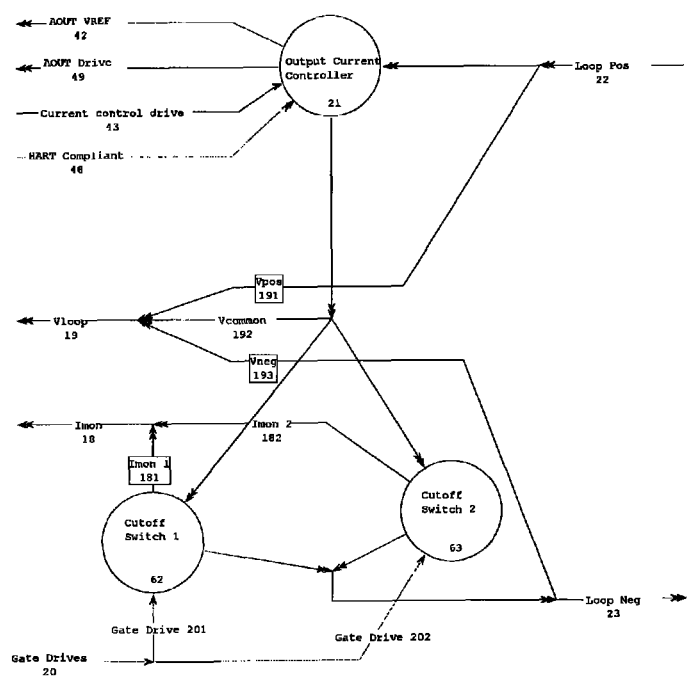
FIG. 7 is an alternative illustration of signals passing between the various modules of the analogue output drive.

The channel output drive will now be described in more detail with reference to FIGS. 6 and 7.

The channel output drive 21 comprises output current controller 60, 61 and cutoff switches 16. The output current controller comprises a digital to analogue converter circuit 60 and a gate circuit 61. The digital to analogue converter circuit 60 receives the current control drive signal 43 and returns a voltage reference signal 42. The digital to analogue converter circuit 60 also receives the HART compliant signal 48 and adds that to the converted current control drive signal to generate drive signal 49 to drive the gate circuit 61. Cutoff switches 16 comprise cutoff switch 1 and cutoff switch 2 connected in parallel such that both cutoff switches need to be disabled in order to disable the 4-20 mA current signals 22, 23 and effectively disable the output module, putting it into a failsafe state. Cutoff switch 62 is driven by gate drive signal 202, cutoff switch 63 is driven by gate drive signal 201.

Current monitor signals 181 and 182 are used to monitor the current flowing through each cutoff switch respectively. Voltage monitor signal 191, 192 and 193 are returned to both the availability management unit 14 and the safety management unit 13.

The operation of the various modules will now be described in more detail.

Command and response messages sent over signal busses 131, 132, 141, 142, 143 comprise packets of data containing a command/response byte and a data field. The content and permitted value of the data field depends upon the particular command/response being sent. The command byte informs the receiving entity the command to be performed for example the I/O bus interface 12 may request data relating to the monitored voltages or currents, may send commands to set or reset various parameters to be used by the availability management unit 14 or the safety management unit 13 or may send commands instructing the availability management unit 14 or the safety management unit 13 to change state.

Figure 8:
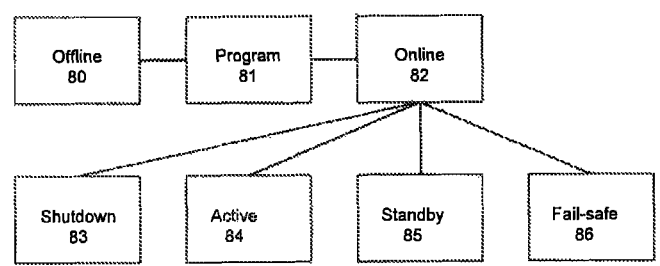
FIG. 8 illustrates the possible state of each of the availability management unit and the safety management unit.

The availability and safety management units 14, 13 have three modes of operation as illustrated in FIG. 8. Offline mode 80 allows calibration constants and safety thresholds to be set and saved to memory. Program mode 81 allows code in the relevant microprocessor to be updated.

In online mode 82 there are four status modes. Shutdown 83, Active 84, Standby 85 and Fail-safe 86. The unit will change status in response to received commands from the I/O bus interface 12 and in response to changes in Analogue Output Module (AOM)/Partner AOM or AMU-SMU Link channel status variables.

The availability management unit 14 and safety managements unit 13 receive and validate command messages from the I/O bus interface 12 and generate response signals to the I/O bus interface 12.

Furthermore, the safety management unit 13 and the availability management unit exchange status data with their corresponding partner unit 13' 14' and with each other.

The availability management unit 14 and the safety management unit determine a current demand independently from one another both on the basis of command signals received from the I/O bus interface 12 and on determined values of current channel status variables relating to the Analogue Output Module (AOM) channel status, Partner AOM channel status and AMU-SMU Link status. As well as the status values mentioned above (Shutdown, Active, Standby and Failsafe) status values may also be set to "Fault" or "Unknown."

The AMU 14 communicates with the partner AMU 14' in order to communicate the respective present channel status to one another.

The AMU 14 and partner AMU 14' communicate using full-duplex serial universal asynchronous receiver/transmitter (UART) links. The messages contain data relating to the "AOM Ch State" as well as acknowledging the presently determined "Partner AOM Ch State." Messages are sent every 0.5 ms. Failure to receive a new message within 2 ms results in "Partner AOM Ch State" being set to "Unknown" and "Partner AOM Link Fault" being set to TRUE.

The AMU 14 and SMU 13 communicate with one another via a Serial Peripheral Interface (SPI) Bus. The AMU is the SRI master and the SMU is the SPI slave. The AMU monitors the SPI link and if no data has been received from the SMU after an interval of 2 ms "AMU-SMU Link Fault" is set to TRUE. The AMU sends data to the SMU every 1 ms regarding the "AOM Ch State" and the "Partner AOM Ch State" amongst other things.

The SMU 13 and partner SMU 13' communicate using full-duplex serial universal asynchronous receiver/transmitter (UART) links. The messages contain data relating to the "AOM Ch State" as well as acknowledging the presently determined "Partner AOM Ch State." Messages are sent every 0.5 ms. Failure to receive a new message within 2 ms results in "Partner AOM Ch State" being set to "Unknown" and "Partner AOM Link Fault" being set to TRUE.

The present statuses are made available to the current demand control process on the AMU 14 to determine a required current demand to be translated into a suitable drive value for the current control drive signal 43.

A parallel SMU current demand control process operates on the SMU 13 the output of which is used by a signal monitor process which will be described in more detail later.

The basic algorithm can be quite simple:

In receipt of a commanded current message from the I/O driver:

```
If the AOM channel is Active then
    If Partner AOM channel is Active then
        set current demand = 0.5 * commanded current
    else
        set current demand = commanded current
```

For illustrative purposes a simple embodiment where each of two modules provides 50% of the commanded current is described.

It will be appreciated that more complex algorithms may be used, whereby a different proportion of the current could be provided by each output module as long as the sum of the current demands from each module remains equal to the commanded current.

Furthermore it will be appreciated that more than two analogue output modules could be employed each providing a proportion of the output current as long as the sum of the current demands from all of the modules remains equal to the commanded current.

The availability management unit 14 also manages the Manage HART I/O and transmits data to the SMU 13 relating to the current status of the HART I/O link. However the details of the HART I/O implementation are not relevant to the present invention.

The SMU 13 has a fail safe guard band (FSGB) monitor and a gate drive controller which operate as follows.

The FSGB monitor monitors the loop voltage via loop voltage signals 19. If the loop voltage is less than a predetermined safety threshold (3V in the present invention) then a fault status variable indicating a line fault is set to TRUE. The fault status variable is used by the gate drive controller as will be described in due course.

In the event of a line fault then no further monitoring of the current is performed by the FSGB monitor process.

Assuming no line fault is detected then the FSGB monitor uses the current demand determined by the SMU's own independently generated current demand control process together with the input current signals 18 to determine whether the correct loop current is being generated by the AMU 14.

The loop current driven by the AMU 14 is the total of the current 181 flowing through the first cutoff switch 62 and the current 182 flowing through the second cutoff switch 63.

Although not relevant to the present invention, the monitored current signals 18 are filtered over a number of samples to remove the effect of any superimposed HART I/O signal 48.

The SMU compares the independently generated current demand (the expected current) with the total loop current (the driven current) and in the event that the difference is greater than a predetermined threshold for a predetermined period of time then a "guard band" fault status, indicating a guard band fault is set to TRUE.

A guard band fault status of TRUE causes the AOM CH State to be set to "Failsafe" which in turn will cause the gate drive controller to switch off both cutoff switches.

The guard band process uses a first threshold and a first predetermined period of time as well as a second threshold and a second predetermined period of time, the first threshold is greater than the second threshold (in the preferred embodiment of the invention it is 2× the second threshold) and the first predetermined period of time is shorter than the second predetermined period of time. This means a guard band fault can be set if the expected current varies widely from the driven current for a shorter period or if the expected current varies by a smaller amount from the driven current for a longer period. The thresholds can be "hard wired" into the control process or they may be set by commands received via the I/O bus interface 12.

The operation of the gate drive controller will now be described.

The gate drives are turned off when the AOM Ch State indicates "Ch Failsafe" OR (AOM Ch State indicates "Ch shutdown" and the Shutdown Mode is "Shutdown Off").

Otherwise the controller cycles around a sequence of gate drive control signals that alternately switch either gate off and the controller establishes that:

a) The gate commanded off is passing less than 100 uA, b) The gate remaining on is conducting.

If one or the other of these tests fails the gate is deemed faulty. The gate drive controller provides an improvement on presently available cutoff or isolation switches because the gates are constantly tested whilst operating under live conditions so a faulty gate is very quickly identified and isolated.

Because a gate may take up to 20 ms to turn off, the tests are performed immediately prior turning the gate back on again.

The gates do not need to be tested at any particular intervals. However, they are preferably tested at an interval less than the mean time to detect a fault appropriate to a low demand system. It is preferred to alternate between the cutoff switches between every 100 ms and 30 s.

No change in gate state is permitted while HART I/O is in progress unless this should cause a delay in gate testing that exceeds 30 seconds.

It will be appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

The present invention may be part of a "safety system" used to protect human life and limb in a field, warehouse, factory or industrial, environment. Nevertheless, the term "safety," "safely" or "safe" as used herein is not a representation that the present invention will make the environment safe or that other systems will produce unsafe operation. Safety in an industrial process depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

What is claimed is:

1. An apparatus for industrial process control comprising one or more input modules, one or more processing modules and one or more analogue output modules an analogue output module of said one or more analogue output modules comprising:
    an availability management unit receiving a signal indicating a commanded current and determining a signal to control an output drive circuit to generate a first driven current; and
    a safety management unit receiving a signal indicating a commanded current and a signal indicating a driven current; and comprising means to determine an expected first driven current and a difference between the first driven current and the expected first driven current and driving
    a pair of parallel cutoff switches to disable the first driven current in an event that the difference between the first driven current and the expected first driven current is greater than a predetermined threshold and in which in operation the safety management unit is arranged to alternately drive the cutoff switches such that
    a first one of said pair of parallel cutoff switches is switched off;
    a second one of said pair of parallel cutoff switches remains on; and
    the safety management unit determines whether a current in the said first one of said pair of parallel cutoff switches is below a predetermined minimum current threshold;
    said a first one of said pair of parallel cutoff switches is switched on;
    said second one of said pair of parallel cutoff switches is switched off;
    the safety management unit determines whether a current in the said second one of said pair of parallel cutoff switches is below a predetermined minimum current threshold; and
    in an event that a cutoff switch allows current above said predetermined threshold when switched off the safety management unit will set an analogue output channel state to failsafe.

2. The apparatus according to claim 1, in which the first driven current comprises a first portion of the commanded current, and in which the apparatus further comprises a second analogue output module comprising:
    a second availability management unit receiving a signal indicating a commanded current and determining a signal to control an output drive circuit to generate a second driven current comprising a second portion of the commanded current; and
    a second safety management unit receiving a signal indicating a commanded current and a signal indicating a second driven current; and comprising means to determine an expected second driven current and a difference between the second driven current and the expected second driven current; and
    arranged to drive said pair of parallel cutoff switches arranged to disable the second driven current in the event that the difference between the second driven current and the expected second driven current is greater than a predetermined threshold.

3. The apparatus according to claim 2, in which a sum of said first portion and said second portion is equal to the commanded current.

4. The apparatus according to claim 3, in which in the event that the first driven current is disabled the second availability management unit is arranged to set the second portion to be equal to the commanded current.

5. The apparatus according to claim 3, in which in the event that the second driven current is disabled the second availability management unit is arranged to set the first portion to be equal to the commanded current.

6. The apparatus according to claim 3, in which said first portion and said second portion are equal to 50% of the commanded current.

7. The apparatus according to claim 1, in which the cutoff switch is arranged in operation to disable the first driven current in the event that the difference between the first driven current and the expected first current is greater than a first predetermined threshold for a first predetermined time or in the event that the difference between the first driven current and the expected first current is greater than a second predetermined threshold for a second predetermined time and in which the first predetermined threshold is greater than the second predetermined threshold and the first predetermined time is shorter than the second predetermined time.

8. A method of testing cutoff switches in an industrial process control comprising one or more input modules, one or more processing modules and one or more analogue output modules the method comprising:
   an availability management unit receiving a signal indicating a commanded current and determining a signal to control an output drive circuit to generate a first driven current; and
   a safety management unit receiving a signal indicating a commanded current and a signal indicating a driven current; and determining an expected first driven current and a difference between the first driven current and the expected first driven current and driving
   a pair of parallel cutoff switches to disable the first driven current in an event that the difference between the first driven current and the expected first driven current is greater than a predetermined threshold wherein the cutoff switches are alternately switched on and off the method sub steps comprising:
   switching/keeping on a second one of said pair of parallel cutoff switches;
   switching off a first one of said pair of parallel cutoff switches; and
   determining whether a current in the said first one of said pair of parallel cutoff switches is below a predetermined minimum current threshold;
   switching on said a first one of said pair of parallel cutoff switches;
   switching off said second one of said pair of parallel cutoff switches;
   determining whether a current in the said second one of said pair of parallel cutoff switches is below a predetermined minimum current threshold; and in an event that a cutoff switch allows current above said predetermined threshold when switched of setting an analogue output channel state to failsafe.

9. The method according to claim 8, in which the first driven current comprises a first portion of the commanded current, further comprising:
   a second availability management unit receiving a signal indicating a commanded current and determining a signal to control an output drive circuit to generate a second driven current comprising a second portion of the commanded current; and
   a second safety management unit receiving a signal indicating a commanded current and a signal indicating a second driven current; determining an expected second driven current and a difference between the second driven current and the expected second driven current; and
   disabling the second driven current in the event that the difference between the second driven current and the expected second driven current is greater than the predetermined threshold.

10. The method according to claim 9, in which a sum of said first portion and said second portion is equal to the commanded current.

11. The method according to claim 10, in which in the event that the first driven current is disabled setting the second portion to be equal to the commanded current.

12. The method according to claim 10, in which in the event that the second driven current is disabled setting the first portion to be equal to the commanded current.

13. The method according to claim 10, in which said first portion and said second portion are equal to 50% of the commanded current.

14. The method according to claim 9, comprising the steps of disabling the first driven current in the event that the difference between the first driven current and the expected first current is greater than a first predetermined threshold for a first predetermined time or in the event that the difference between the first driven current and the expected first current is greater than a second predetermined threshold for a second predetermined time and in which the first predetermined threshold is greater than the second predetermined threshold and the first predetermined time is shorter than the second predetermined time.

* * * * *